(12) United States Patent
Nguyen

(10) Patent No.: US 9,835,719 B2
(45) Date of Patent: Dec. 5, 2017

(54) SYSTEMS AND METHODS FOR ADAPTIVE SENSOR ANGLE POSITIONING IN VEHICLES

(71) Applicant: Denso International America, Inc., Southfield, MI (US)

(72) Inventor: Trong Duy Nguyen, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/131,540

(22) Filed: Apr. 18, 2016

(65) Prior Publication Data

US 2017/0299707 A1 Oct. 19, 2017

(51) Int. Cl.

| | | |
|---|---|---|
| G01S 13/00 | (2006.01) |
| G01S 15/00 | (2006.01) |
| G01S 17/00 | (2006.01) |
| G01S 19/00 | (2010.01) |
| G01S 13/02 | (2006.01) |
| G01S 15/02 | (2006.01) |
| G01S 17/02 | (2006.01) |
| G01S 19/13 | (2010.01) |
| B60W 40/105 | (2012.01) |
| B62D 6/00 | (2006.01) |
| B60T 7/12 | (2006.01) |
| G01S 7/497 | (2006.01) |
| B60W 30/095 | (2012.01) |

(52) U.S. Cl.
CPC .............. *G01S 13/02* (2013.01); *B60T 7/12* (2013.01); *B60W 40/105* (2013.01); *B62D 6/00* (2013.01); *G01S 7/4972* (2013.01); *G01S 15/02* (2013.01); *G01S 17/02* (2013.01); *G01S 19/13* (2013.01); *B60Q 2300/322* (2013.01); *B60W 30/095* (2013.01)

(58) Field of Classification Search
None
See application file for complete search history.

(56) References Cited

U.S. PATENT DOCUMENTS

| | | |
|---|---|---|
| 7,541,743 B2 | 6/2009 | Salmeen et al. |
| 7,611,266 B2 | 11/2009 | Ibrahim et al. |
| 8,967,316 B2 | 3/2015 | Huth |
| 8,983,708 B2 | 3/2015 | Choe et al. |

(Continued)

FOREIGN PATENT DOCUMENTS

DE   102005022677   * 11/2006   ........... G01S 7/4026

OTHER PUBLICATIONS

Haug, DE 102005022677 A1 EPO machine translation Apr. 5, 2017, all pages.*

*Primary Examiner* — Yonel Beaulieu
*Assistant Examiner* — Kevin P Mahne
(74) *Attorney, Agent, or Firm* — Harness, Dickey & Pierce, P.L.C.

(57) ABSTRACT

A system and method are provided and include a subject vehicle having a sensor that senses information about an environment of the subject vehicle. An actuator rotates the sensor according to a commanded angle. A controller determines a position and a trajectory path of the subject vehicle, determines an adaptive point along the determined trajectory path based on the position, and generates the commanded angle for the actuator to rotate the sensor towards the adaptive point.

16 Claims, 9 Drawing Sheets

(56) References Cited

U.S. PATENT DOCUMENTS

| | | | |
|---|---|---|---|
| 2002/0049539 A1* | 4/2002 | Russell | G01S 13/931 701/301 |
| 2011/0133646 A1* | 6/2011 | Nakazawa | B60Q 1/10 315/77 |
| 2013/0286671 A1 | 10/2013 | Breiner et al. | |
| 2014/0098551 A1* | 4/2014 | Krauss | B60Q 1/12 362/465 |
| 2015/0039218 A1 | 2/2015 | Bowers et al. | |
| 2015/0066323 A1* | 3/2015 | Ouchi | B60T 7/22 701/70 |
| 2016/0139255 A1* | 5/2016 | Bueschenfeld | G01S 13/89 342/146 |

* cited by examiner

SYSTEMS AND METHODS FOR ADAPTIVE SENSOR ANGLE POSITIONING IN VEHICLES

FIELD

The present disclosure relates to systems and methods for adaptive sensor angle positioning in vehicles and, more particularly, to adaptive angle positioning for environmental sensors of a vehicle.

BACKGROUND

This section provides background information related to the present disclosure, which is not necessarily prior art.

Although systems exist for utilizing sensors, such as cameras, Lidar sensors, radar sensors, ultrasonic sensors, etc., to sense information about the environment surrounding a vehicle and assist a driver of the vehicle, such systems utilize sensors at fixed positions and are subject to improvement. The present teachings advantageously provide systems and methods utilizing sensors with an improved field of view to gain better information about the environment surrounding a vehicle and provide improved assistance to a driver of the vehicle and/or control of vehicle systems.

SUMMARY

This section provides a general summary of the disclosure, and is not a comprehensive disclosure of its full scope or all of its features.

The present teachings include systems and methods for a subject vehicle having a sensor that senses information about an environment of the subject vehicle. An actuator rotates the sensor according to a commanded angle. A controller determines a position and a trajectory path of the subject vehicle, determines an adaptive point along the determined trajectory path based on the position, and generates the commanded angle for the actuator to rotate the sensor towards the adaptive point.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
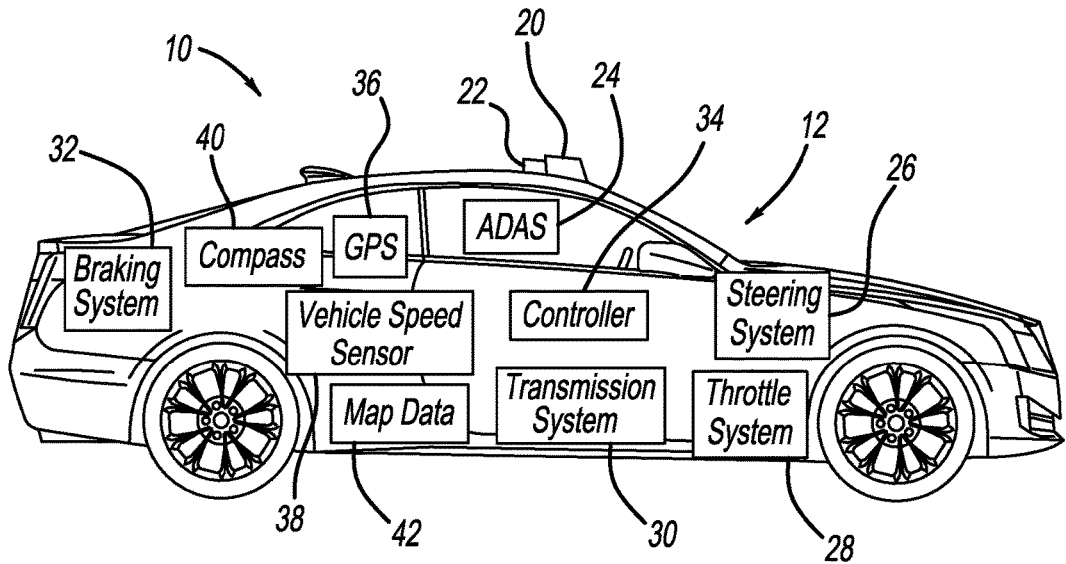
FIG. 1 illustrates a subject vehicle including an environmental sensor and a sensor actuator that adjusts an angle of the environmental sensor.

With reference to FIG. 1, a vehicle 10 including a system 12 according to the present teachings is illustrated. Although the vehicle 10 is illustrated as an automobile in FIG. 1, the present teachings apply to any other suitable vehicle, such as a sport utility vehicle (SUV), a mass transit vehicle (such as a bus), or a military vehicle, as examples. The system 12 is configured with an environmental sensor 20, such as a camera, a Lidar sensor, a radar sensor, an ultrasonic sensor, or other sensor for detecting information about the surroundings of the vehicle 10, including, for example, other vehicles, lane lines, guard rails, objects in the roadway, buildings, pedestrians, etc., While the vehicle 10 is shown with one environmental sensor 20 for purposes of illustration, the vehicle 10 may be equipped with additional environmental sensors at different locations on the vehicle, including additional environmental sensors of the same or different type. For example, the vehicle 10 may be equipped with one or more cameras, one or more Lidar sensors, one or more radar sensors, one or more ultrasonic sensors, and/or one or more other environmental sensors. One or more of the environmental sensor(s) 20 may be equipped with a sensor actuator(s) 22 for controlling an angle of the field of view of the environmental sensor(s) 20 relative to the vehicle 10, as described in further detail below.

As shown in FIG. 1, the system 12 includes an advanced driver assistance system (ADAS) 24 to assist a driver of the vehicle 10 (often referred to as the subject vehicle). For example, the ADAS 24 may include systems to automate, adapt, and enhance vehicle systems for safety and better driving, including systems to avoid collisions and accidents by alerting the driver to potential issues or hazards and/or to take over or assist with control of the vehicle 10. For example, based on environmental information about the surroundings of the vehicle 10, as sensed by the environmental sensors 20, the ADAS 24 may: generate an alert to the driver; adjust or control a steering system 26 of the vehicle 10; adjust or control a throttle system 28 of the vehicle 10; adjust or control a transmission system 30 of the vehicle 10; and/or adjust or control a braking system 32 of the vehicle. While the vehicle 10 is shown with an ADAS 24 in FIG. 1, the present teachings also apply to a fully autonomous vehicle with systems for exclusively controlling the steering system 26, throttle system 28, transmission system, and/or braking system 32, without input from the driver of the vehicle 10, based on environmental information about the surroundings of the vehicle 10, as sensed by the environmental sensors 20.

As shown in FIG. 1, the system 12 also includes a controller 34 that, as described in further detail below, can receive information sensed by the environmental sensors 20 and/or other vehicles systems and can control the sensor actuators 22 to implement the systems and methods for adaptive sensor angle positioning according to the present teachings. In this application, including the definitions below, the terms "controller," "module," and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the controller, modules, and systems described herein. In addition, in this application the terms "module" or "controller" may be replaced with the term "circuit."

As shown in FIG. 1, the system 12 also includes a global positioning system (GPS) 36 that detects or determines a current position of the vehicle 10. The system 12 also includes a vehicle speed sensor 38 that detects or determines a current speed of the vehicle 10. The system 12 also includes a compass 40 that detects or determines a current direction of the vehicle 10. The system 12 also includes map data 42 stored in a memory that can be generated and/or updated by the system 12 based on GPS data from the GPS 36 and/or environmental information sensed by the environmental sensors 20, as described in further detail below.

Figure 2:
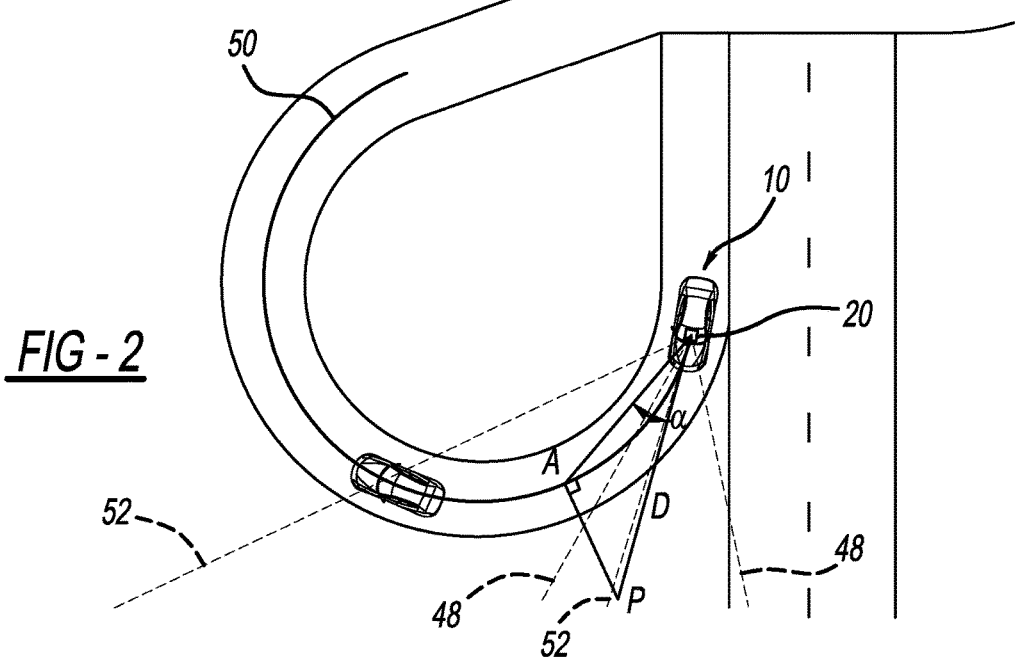
FIG. 2 illustrates the subject vehicle on a curved entrance ramp of a roadway with the environmental sensor at an initial angle and at an adapted angle.

With reference to FIG. 2, the subject vehicle 10 is shown positioned on a curved entrance ramp of a roadway. For example, the curved entrance ramp may allow for travel, for example, from a local roadway to a limited access expressway or freeway. As further described below, the controller 34 of the vehicle 10 may control a sensor actuator 22 to adjust an angular position of the environmental sensor 20 and a corresponding field of view of the environmental sensor 20. For example, the environmental sensor 20 may be initially positioned at an angle pointed straight ahead of the vehicle 10, corresponding to the direction of the vehicle 10. As illustrated in FIG. 2, in the initial position, the environmental sensor 20 is pointed towards a point "P", which is in a direction straight ahead of the vehicle 10 in the direction corresponding to the direction in which the vehicle 10 is pointing. At this initial position, the field of view of the environmental sensor 20 corresponds to the field of view indicated by dashed lines 48. As described in further detail below, the controller 34 determines the location of the point "P", which is located a preset distance away from the vehicle 10 in the current direction of the vehicle 10. For example, the preset distance may be fifty meters. The preset distance can be input, selected, or modified by a driver, operator, repair person, dealer, and/or manufacturer of the vehicle 10. As further described below, the controller 34 then determines a trajectory path 50 of the vehicle 10. For example, the controller 34 may determine the trajectory path 50 of the vehicle 10 based on GPS data from the GPS 36, including the current position of the vehicle 10. The controller 34 may also determine the trajectory path 50 of the vehicle 10 based on the current speed of the vehicle 10 as indicated by the vehicle speed sensor 38. The controller 34 may also determine the trajectory path 50 of the vehicle 10 based on map data 42 stored in memory that is generated based on information from the GPS 36 and/or based on information sensed by the environmental sensors 20, as described in further detail below. Once the trajectory path 50 is determined, the controller 34 can determine a point "A" that is the nearest point on the trajectory path 50 to the previously determined point P. Once the location of the point A is determined, the controller 34 can determine the angle α between the line from the environmental sensor 20 and the point P and the line from the environmental sensor 20 and the point A. The controller 34 can then control the sensor actuator 22 to rotate the environmental sensor(s) 20 based on the adjusted angle α so that the environmental sensor(s) 20 are pointed towards the point A. When at the adjusted positioned corresponding to the adjusted angle α, the field of view of the environmental sensor 20 corresponds to the field of view indicated by dashed lines 52, as shown in FIG. 2.

As illustrated in FIG. 2, the adjusted field of view indicated by dashed lines 52 when the environmental sensor 20 is rotated to an adjusted position corresponding to the adjusted angle α advantageously provides the controller 34 with more relevant environmental information about the surroundings of the vehicle 10 and the anticipated area of travel of the vehicle 10. For example, as shown in FIG. 2, a secondary vehicle is traveling ahead of the subject vehicle 10. The secondary vehicle, however, does not fall within the initial field of view indicated by dashed lines 48, but does fall within the adjusted field of view indicated by dashed lines 52. In this way, the system 12 is able to obtain and process more relevant environmental information about the surroundings of the vehicle 10 so that the controller 34 and/or the ADAS 24 can identify, for example, other vehicles, lane lines, guard rails, objects in the roadway, buildings, pedestrians, etc., that are along the anticipated trajectory path of the vehicle 10 and within the anticipated area of travel of the vehicle 10.

Figure 3A:
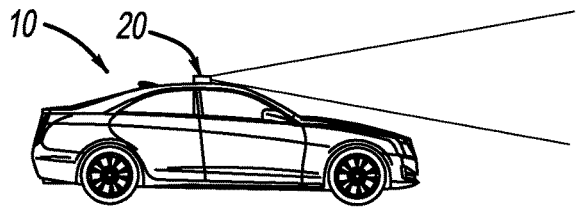
FIG. 3A illustrates the subject vehicle with an environmental sensor located on the roof of the subject vehicle.
Figure 3A:
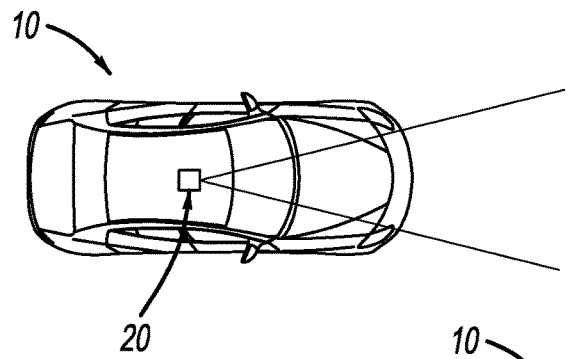
Figure 3B:
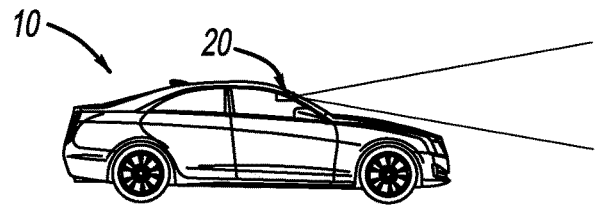
FIG. 3B illustrates the subject vehicle with an environmental sensor located on a rearview mirror of the subject vehicle.
Figure 3B:
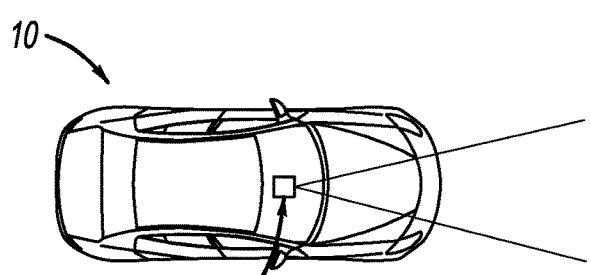
Figure 3C:
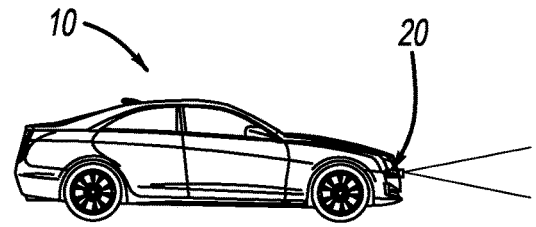
FIG. 3C illustrates the subject vehicle with an environmental sensor located on a front bumper of the subject vehicle.
Figure 3C:
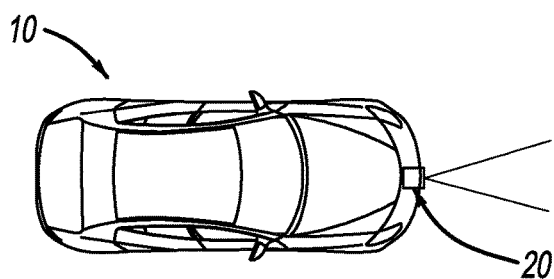

With reference to FIGS. 3A to 3C, a number of different locations for an environmental sensor 20 are shown. For example, as shown in FIG. 3A, the environmental sensor 20 can be positioned on a roof of the vehicle 10. As shown in FIG. 3B, the environmental sensor 20 can be positioned on a rearview mirror of the vehicle 10. As shown in FIG. 3C, the environmental sensor 20 can be positioned on a front bumper of the vehicle 10. While these example positions are shown for purposes of illustration in FIGS. 3A to 3C, one or more environmental sensors 20 can be positioned at any location on, within, or around the vehicle 10.

Figure 4:
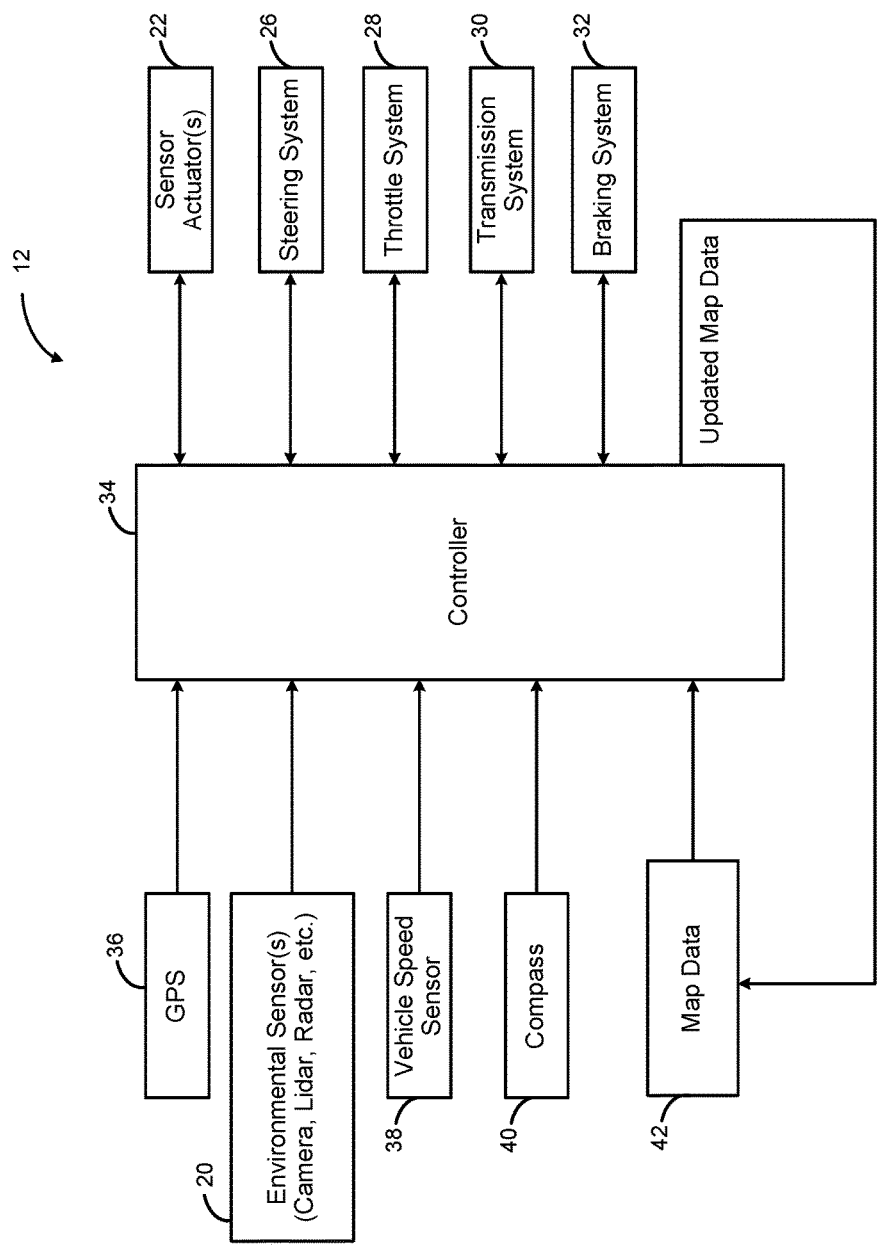
FIG. 4 illustrates a block diagram of a system according to the present teachings for adjusting an angle of environmental sensor(s) of the subject vehicle.

With reference to FIG. 4, a block diagram of a system 12 according to the present teachings for adjusting an angle of one or more environmental sensors 20 of the vehicle 10 is shown. The system 12 includes the controller 34, the one or more environmental sensors 20, the vehicle speed sensor 38, and the compass 40. The system 12 also includes the GPS 36 and/or the map data 42 stored in memory. As described in further detail below, the controller 34 can generate output to control the sensor actuators 22 to adjust an angle of the environmental sensors 20. As further described below, the controller 34 can also generate output to assist, adjust, or control the steering system 26, the throttle system 28, the transmission system 30, and/or the braking system 32. For example, the controller 34 can adjust a steering angle of the steering system 26 to change a direction of travel of the vehicle 10. Additionally or alternatively, the controller 34 can adjust a throttle position of the throttle system 28 to adjust a current speed of the vehicle 10. Additionally or alternatively, the controller 34 can shift up or shift down a current gear of the transmission system 30. Additionally or alternatively, the controller 34 can activate or deactivate one or more brakes of the braking system 32. Additionally, when map data 42 is used by the system 12, the controller 34 can generate updated map data, based on environmental information sensed by the environmental sensors, that is then fed back and used to update the map data 42 stored in memory.

The controller 34 can also receive feedback from the sensor actuator(s) 22 indicating the current angle of the corresponding environmental sensor(s) 20. The controller 34 can also receive feedback from the steering system 26 indicating the current angle of the steering wheel of the steering system 26. The controller 34 can also receive feedback from the throttle system 28 indicating the current position of the throttle of the throttle system 28. The controller 34 can also receive feedback from the transmission system 30 indicating a current gear of the transmission system 30. The controller 34 can also receive feedback from the braking system 32 indicating a current level of braking being applied by the brakes of the braking system 32.

Figure 5:
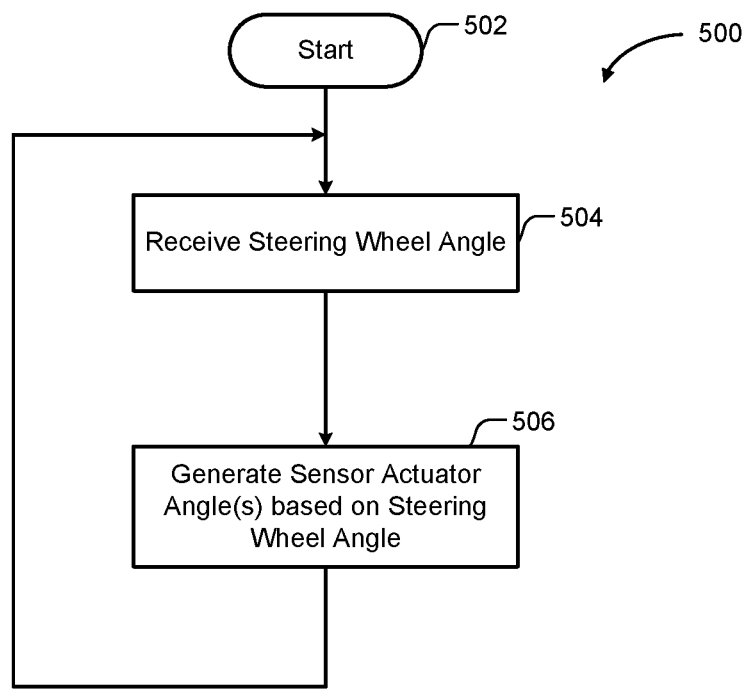
FIG. 5 illustrates a flow diagram for a method according to the present teachings for adjusting an angle of environmental sensor(s) of the subject vehicle based on a steering wheel angle.

With reference to FIG. 5, a flowchart for a method 5 is shown. The method 500 generates adjusted sensor actuator angle(s) based on a current angle of the steering wheel of the steering system 26. The method 500 can be performed by the controller 34 and/or any other suitable control or processing device. The method starts at 502.

At 504, the controller 34 receives the current steering wheel angle of the steering wheel of the steering system 26. At 506, the controller 34 generates and outputs an adjusted angle, based on the angle of the steering wheel, to the sensor actuator(s) so that the environmental sensor(s) 20 are rotated to an angle corresponding to the current steering wheel angle. In this way, as the vehicle 10 is, for example, traveling on a curved roadway, the environmental sensor(s) 20 are rotated at an adjusted angle, corresponding to the steering wheel angle, so that more of the curved roadway and the current trajectory path of the vehicle are within the field of view of the environmental sensor(s) 20. The controller 34 then loops back to 504. In the method 500, however, as the vehicle 10 is approaching the curved roadway, for example, the sensor actuator(s) 22 will not rotate ahead of time to an adjusted angle until steering wheel turns as the vehicle 10 enters the curved section of roadway.

Figure 6:
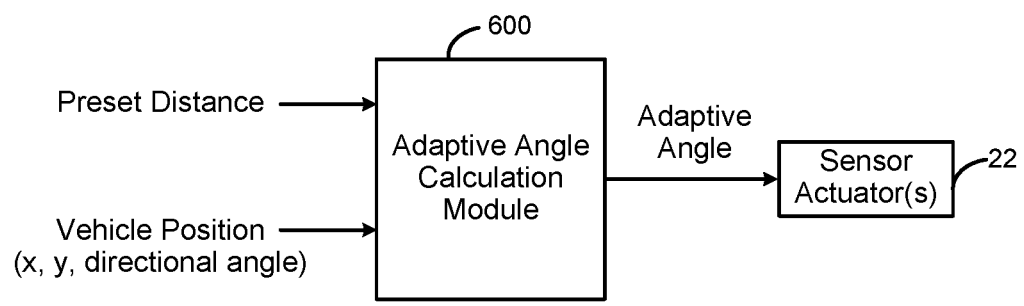
FIG. 6 illustrates a block diagram of an adaptive angle calculation module according to the present teachings for adjusting an angle of environmental sensor(s) of the subject vehicle.

With reference to FIG. 6, a block diagram of a portion of the system 12 according to the present teachings for adjusting an angle of one or more environmental sensors 20 of the vehicle 10 is shown. The portion of the system 12 includes an adaptive angle calculation module 600. The adaptive angle calculation module 600 may be implemented with or by the controller 34.

The adaptive angle calculation module 600 receives a preset distance. As described above, the preset distance D can be input, selected, or modified by a driver, operator, repair person, dealer, and/or manufacturer of the vehicle 10. For example, the preset distance D may be fifty meters.

The adaptive angle calculation module 600 also receives a current vehicle position of the vehicle 10. The current vehicle position may include x and y coordinates corresponding to the current physical location of the vehicle from, for example, the GPS. The current vehicle position may also include a current angle, based on direction data from the compass 40, indicating the current direction that the vehicle 10 is facing or pointed towards. In addition, as described in further detail below, the system 12 may include map data 42 stored locally in memory. In such case, the vehicle position may be determined from the local map data 42 stored in memory and based on the feedback from the environmental sensor(s) 20. For example, the adaptive angle calculation module 600 can determine, based on the local map data 42 and based on the information regarding the surroundings from the environmental sensor(s) 20 the current vehicle position, including the x and y coordinates of the vehicle and the current angle or direction that the vehicle 10 is facing or pointed towards.

The adaptive angle calculation module 600 may then determine the trajectory path 50 of the vehicle 10 based on GPS data from the GPS 36, including the current position of the vehicle 10. The adaptive angle calculation module 600 may also determine the trajectory path 50 of the vehicle 10 based on the current speed of the vehicle 10 as indicated by the vehicle speed sensor 38. The adaptive angle calculation module 600 may also determine the trajectory path 50 of the vehicle 10 based on map data 42 stored in memory that is generated based on information from the GPS 36 and/or based on information sensed by the environmental sensors 20. With additional reference to FIG. 2, once the trajectory path 50 is determined, the adaptive angle calculation module 600 can determine a point "A" that is the nearest point on the trajectory path 50 to the previously determined point P. Once the location of the point A is determined, the adaptive angle calculation module 600 can determine the angle α between the line from the environmental sensor 20 and the point P and the line from the environmental sensor 20 and the point A. The adaptive angle calculation module 600 can then output the adjusted angle α to the sensor actuator(s) 22 to rotate the environmental sensor(s) 20 based on the adjusted angle α so that the environmental sensor 20 is pointed towards the point A. As discussed above, when at the adjusted positioned corresponding to the adjusted angle α, the field of view of the environmental sensor 20 corresponds to the field of view indicated by dashed lines 52, as shown in FIG. 2.

Figure 7:
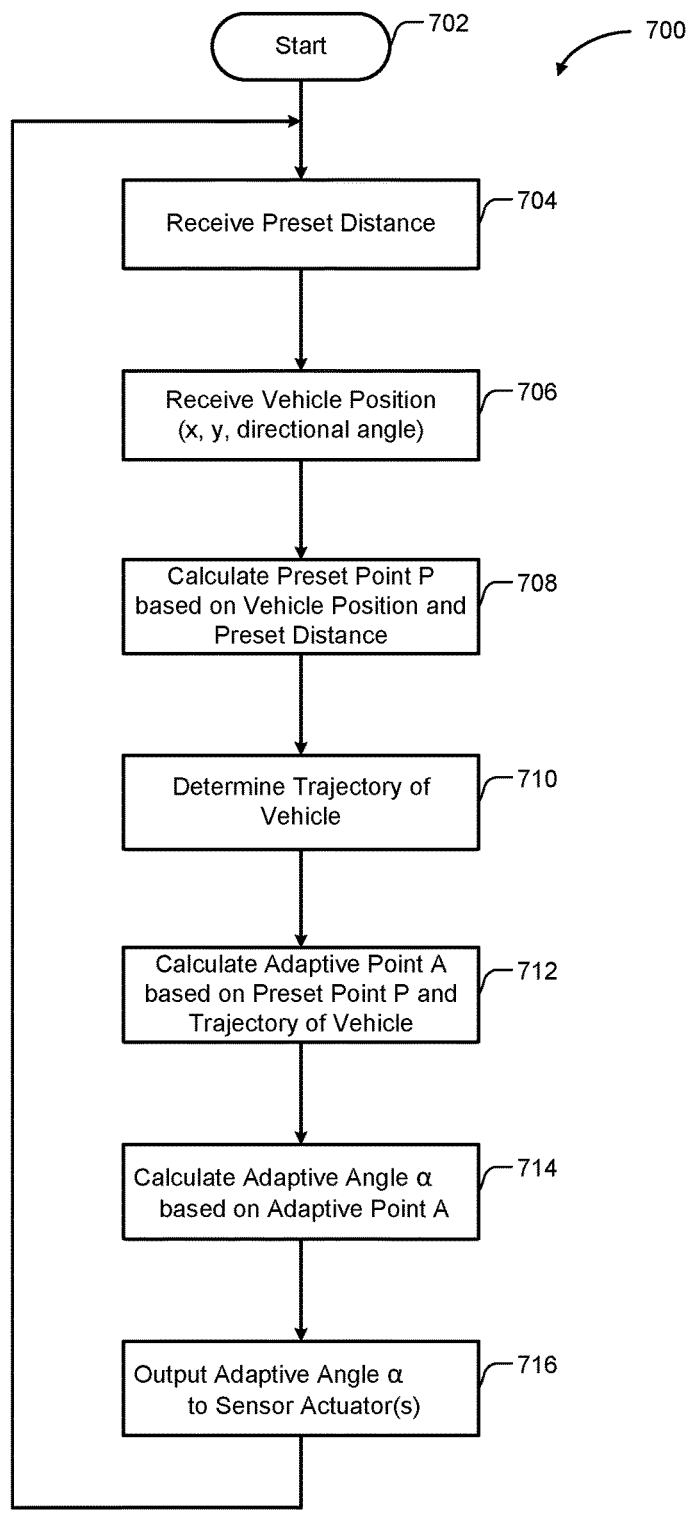
FIG. 7 illustrates a flow diagram for another method according to the present teachings for adjusting an angle of environmental sensor(s) of the subject vehicle based on a preset distance, a vehicle position, and a determined vehicle trajectory.

With reference to FIG. 7, a flowchart for a method 700 is shown. The method 700 generates adjusted sensor actuator angle(s) based on a preset distance, a vehicle position, and a determined vehicle trajectory. The method 700 can be performed by the adaptive angle calculation module 600, the controller 34, and/or any other suitable control or processing device. The method 700 starts at 702.

At 704, the adaptive angle calculation module 600 receives the preset distance. As discussed above, the preset distance D can be input, selected, or modified by a driver, operator, repair person, dealer, and/or manufacturer of the vehicle 10. For example, the preset distance D may be fifty meters.

At 706, the adaptive angle calculation module 600 receives the vehicle position. As discussed above, the vehicle position can include x and y coordinates for the vehicle position and a current angle indicating the current direction that the vehicle 10 is facing or pointed towards. As discussed above the vehicle position can be received and/or determined based on data from the GPS 36, the compass 40, map data 42 stored in memory, and/or surrounding and environmental information and data received from the environmental sensor(s) 20.

At 708, the adaptive angle calculation module 600 calculates the preset point P based on the determined vehicle position and the preset distance D. As described above, the adaptive angle calculation module 600 determines the location of the point P as the point that is located the preset distance D away from the vehicle 10 in the current direction of the vehicle 10.

At 710, the adaptive angle calculation module 600 determines the current trajectory path of the vehicle 10. For example, with additional reference to FIG. 2, the adaptive angle calculation module 600 may determine the trajectory path 50 of the vehicle 10 based on GPS data from the GPS 36, including the current position of the vehicle 10. The adaptive angle calculation module 600 may also determine the trajectory path 50 of the vehicle 10 based on the current speed of the vehicle 10 as indicated by the vehicle speed sensor 38. The adaptive angle calculation module 600 may also determine the trajectory path 50 of the vehicle 10 based on map data 42 stored in memory that is generated based on information from the GPS 36 and/or based on information sensed by the environmental sensors 20, as described in further detail below.

At 712, with continued reference to FIGS. 2 and 7, the adaptive angle calculation module 600 calculates an adaptive point A based on the preset point P and the trajectory path 50 of the vehicle 10. The point A is calculated as the nearest point on the trajectory path 50 to the previously determined point P.

At 714, with continued reference to FIGS. 2 and 7, the adaptive angle calculation module 600 calculates the adaptive angle α between the line from the environmental sensor 20 and the point P and the line from the environmental sensor 20 and the point A.

At 716, the adaptive angle calculation module 600 then outputs the adaptive angle α to the sensor actuator(s) 22 to rotate the environmental sensor(s) 20 based on the adjusted angle α so that the environmental sensor(s) 20 are pointed towards the point A. When at the adjusted positioned corresponding to the adaptive angle α, the field of view of the environmental sensor 20 corresponds to the field of view indicated by dashed lines 52, as shown in FIG. 2. After outputting the adaptive angle α to the environmental sensor (s) 20, the adaptive angle calculation module 600 loops back to 704.

Figure 8:
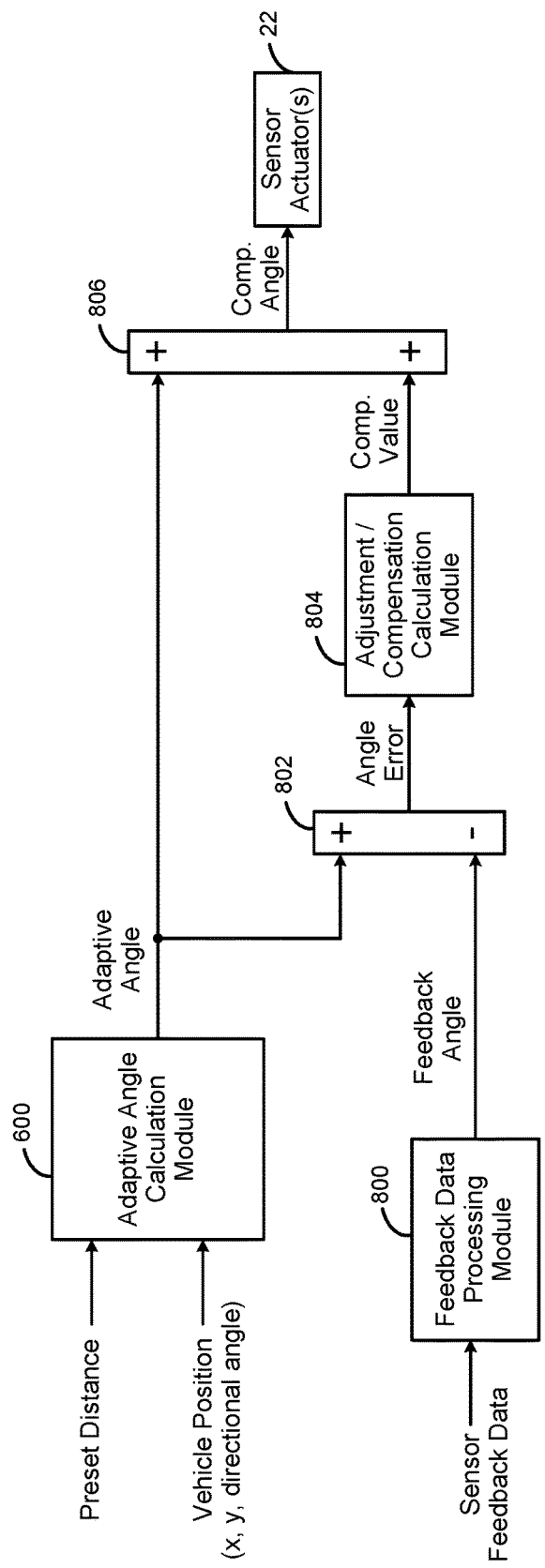
FIG. 8 illustrates a block diagram of the adaptive angle calculation module with an adjustment/compensation calculation module according to the present teachings for adjusting an angle of environmental sensor(s) of the subject vehicle.

With reference to FIG. 8, a block diagram of a portion of the system 12 according to the present teachings for adjusting an angle of one or more environmental sensors 20 of the vehicle 10 is shown. The portion of the system 12 includes the adaptive angle calculation module 600 described above, as well as a feedback data processing module 800, a subtraction module 802, an adjustment/compensation calculation module 804, and an addition module 806. The feedback data processing module 800, the subtraction module 802, the adjustment/compensation calculation module 804, and the addition module 806 may be implemented with or by the controller 34.

The adaptive angle calculation module 600 calculates the adaptive angle α as described above with respect to FIGS. 6 and 7.

The feedback data processing module 800 receives sensor feedback data from an environmental sensor 20. For example, the sensor feedback data may include image data from a camera, and/or radar, Lidar, or ultrasonic data from a radar sensor, a Lidar sensor, or an ultrasonic sensor, respectively. The feedback data processing module 800 reviews, analyzes, and processes the sensor feedback data to determine a current angle of the corresponding environmental sensor 20 relative to the vehicle 10. For example, the feedback data processing module 800 can review, analyze, and process the sensor feedback data to determine data points of the surroundings and of the vehicle. In this way, the feedback data processing module 800 can determine a current angle of the environmental sensor 800 relative to the vehicle 10. The feedback data processing module 800 can also use map data 42 stored in memory to determine the current angle of the environmental sensor 800 relative to the vehicle 10.

The feedback data processing module 800 then outputs the feedback angle determined based on the sensor feedback data from the environmental sensor 20 to the subtraction module 802. The subtraction module 802 also receives the adaptive angle generated by the adaptive angle calculation module 600. The subtraction module 802 determines a difference between the adaptive angle generated by the adaptive angle calculation module 600 and the feedback angle generated by the feedback data processing module 800 and outputs the difference as an angle error to the adjustment/compensation calculation module 804.

The adjustment/compensation calculation module 804 receives the angle error from the subtraction module 802 and determines a compensation value based on the angle error. For example, the adjustment/compensation calculation module 804 may utilize a PI algorithm, a PID algorithm, or other suitable error adjustment and control algorithm to determine the compensation value. The adjustment/compensation calculation module 804 outputs the compensation value to an addition module 806, which adds the compensation value to the adaptive angle generated by the adaptive angle calculation module 600 and outputs a compensated angle. The compensated angle is then outputted to the sensor actuator(s) 22 so that the sensor actuator 22 can rotate the environmental sensor 20 according to the compensated angle.

In this way, the system can compare the calculated adaptive angle with the feedback angle determined based on feedback from the environmental sensor 20 and generate a compensated angle, based on the error between the two angles, to more accurately control the sensor actuators 22 and more accurately rotate the environmental sensors 20 to the appropriate angle to generate an optimized field of view for the environmental sensor 20.

Figure 9:
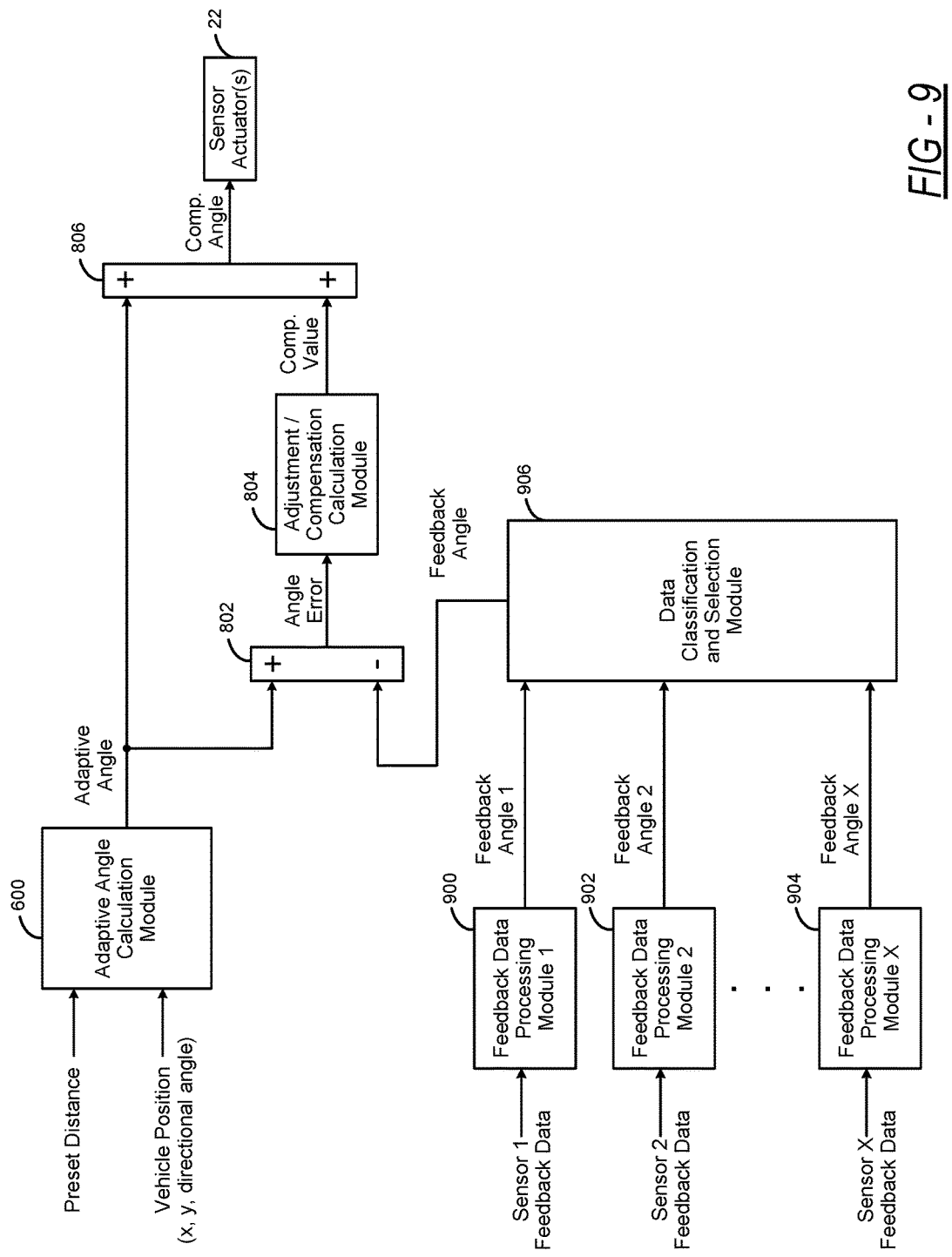
FIG. 9 illustrates a block diagram of the adaptive angle calculation module, the adjustment/compensation calculation module, a data classification and selection module, and multiple feedback data processing modules according to the present teachings for adjusting an angle of environmental sensor(s) of the subject vehicle.

With reference to FIG. 9, a block diagram of a portion of the system 12 according to the present teachings for adjusting an angle of one or more environmental sensors 20 of the vehicle 10 is shown. The portion of the system 12 includes the adaptive angle calculation module 600, the subtraction module 802, the adjustment/compensation calculation module 804, and the addition module 806 described above with respect to FIG. 8, as well as feedback data processing modules 900, 902, 904, and a data classification and selection module 906. The feedback data processing modules 900, 902, 904, and the data classification and selection module 906 may be implemented with or by the controller 34.

As shown in FIG. 9, the system 12 can receive sensor feedback data from multiple different environmental sensors 20. For example, as shown in FIG. 9, sensor feedback data is received from sensor designated as sensor 1 through sensor X. Each sensor feedback data signal has a corresponding feedback data processing module 900, 902, 904. Each of the feedback data processing modules 900, 902, 904 generate a corresponding feedback angle, as described above with respect to the feedback data processing module 800 shown in FIG. 8.

Each of the feedback angles generated by the feedback data processing modules is received by the data classification and selection module 906. The data classification and selection module 906 classifies the generated feedback angles based on the type of environmental sensor 20 that generated the corresponding feedback data. The data classification and selection module 906 then outputs the appropriate feedback angle to the subtraction module 802. For example, the data classification and selection module 906 can output the feedback angle corresponding to the specific environmental sensor 20 for which an adaptive angle is being determined by the adaptive angle calculation module 600. Additionally or alternatively, if multiple environmental sensors 20 are positioned at the same location on the vehicle and are controlled at the same angles, the data classification and selection module 906 can compare and/or average the feedback angles from the different sensors. In such case, the data classification and selection module 906 can output an average feedback angle to the subtraction module 802. As described above, the adjustment/compensation calculation module can output a compensation value based on the angle error from the subtraction module 802. The addition module 806 can add the compensation value to the adaptive angle from the adaptive angle calculation module 600 to determine a compensated angle that is outputted to the sensor actuator 22.

Figure 10:
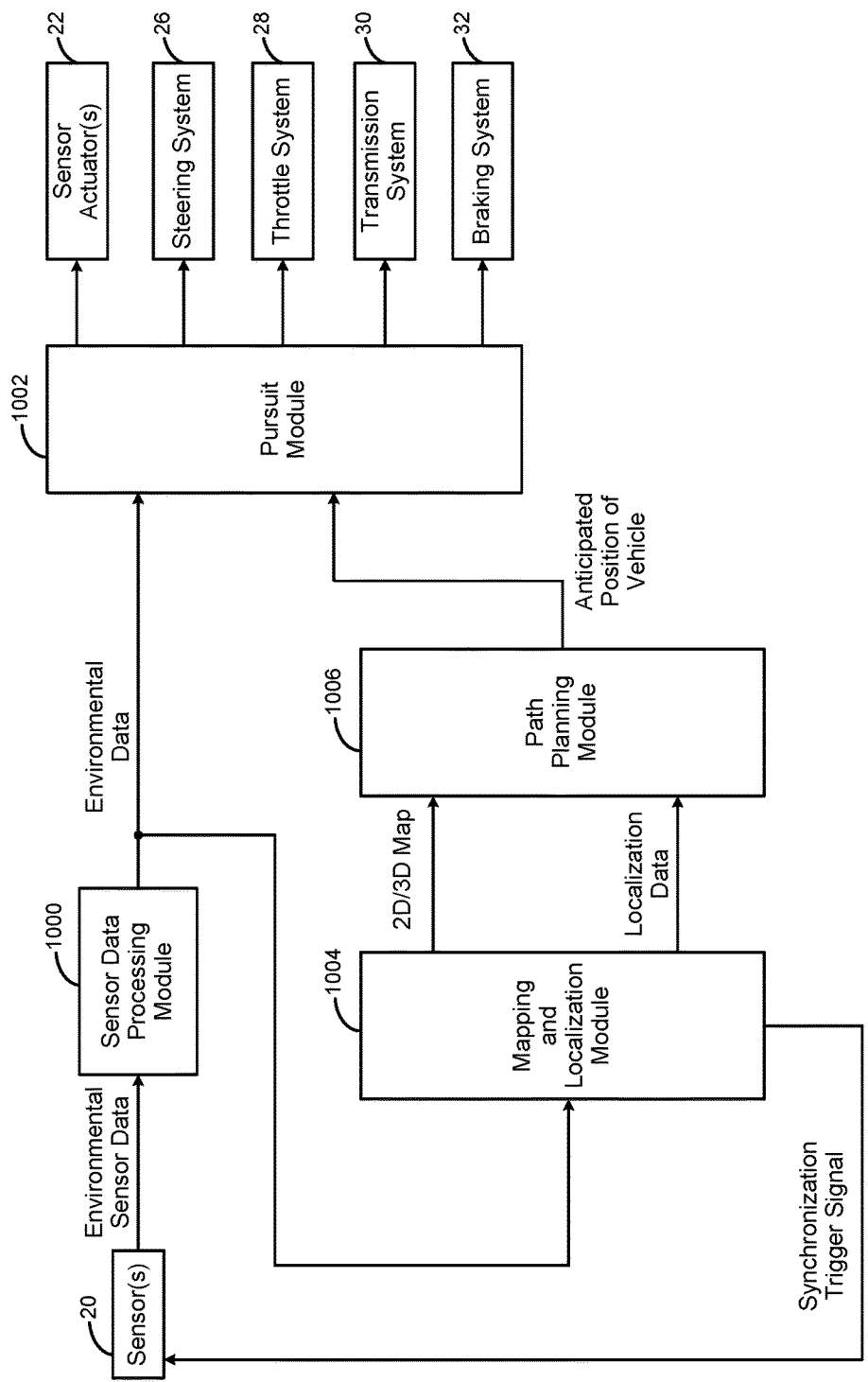
FIG. 10 illustrates a block diagram of a sensor data processing module, a pursuit module, a mapping and localization module, and a path planning module according to the present teachings for adjusting an angle of environment sensor(s) of the subject vehicle.

With reference to FIG. 10, a block diagram of a portion of the system 12 according to the present teachings for adjusting an angle of one or more environmental sensors 20 for the vehicle 10 is shown. The portion of the system 12 includes a sensor data processing module 1000, a pursuit module 1002, a mapping and localization module 1004, and a path planning module 1006. The sensor data processing module 1000, the pursuit module 1002, the mapping and localization module 1004, and the path planning module 1006 can be implemented with or by the controller 34.

The sensor data processing module 1000 receives environmental sensor data from the environmental sensor(s) 20 and generates environmental data about the surroundings of the vehicle 10. In other words, based on the environmental sensor data received from the environmental sensor(s) 20, the sensor data processing module 1000 can synthesize the data from multiple environmental sensors 20 to determine information about the surroundings of the vehicle 10. For example, the sensor data processing module 1000 can determine synthesized data, including: that an accident scene is present in the vicinity of the vehicle 10; that kids are playing ball in the vicinity of the vehicle 10; and/or that a pedestrian is crossing the trajectory path of the vehicle 10; etc. The environmental data may also include an alert or warning level based on the particular activity, scenario, and/or information detected about the surroundings of the vehicle 10. For example, the environmental data may include an alert or warning classified based on severity of the particular activity, scenario, and/or information detected about the surroundings of the vehicle 10. The environmental data generated by the sensor data processing module 1000 is outputted to the pursuit module and the mapping and localization module 1004.

The pursuit module 1002 may control various systems of the vehicle 10 based on the environmental data from the sensor data processing module 1000. For example, the pursuit module 1002 may adjust or control one or more of the steering system 26, the throttle system 28, the transmission system 30, and/or the braking system 32 based on the environmental data. As an example, if the environmental data indicates an object or person, like a pedestrian or child playing, in the trajectory path of the vehicle 10, the pursuit module 1002 may control the steering system 26 to steer the vehicle 10 to avoid the object or person and may control the braking system 32, throttle system 28, and/or transmission system 30 to decrease the speed of the vehicle 10.

The mapping and localization module 1004 receives the environmental data and uses the environmental data to build a two-dimensional and/or three-dimensional map of the environment and area surrounding the vehicle 10. As discussed above the two-dimensional and/or three-dimensional map can be stored as map data 42 in memory. For example, the mapping and localization module 1004 can review, analyze, and synthesize the environmental data to locate objects, roads, lane lines, guard rails, etc., present in the environment and surroundings of the vehicle. Based on the review, analysis, and synthesizing, the mapping and localization can build, generate, and update a two-dimensional and/or three-dimensional map of the environment and surroundings of the vehicle 10. In addition, based on the environmental data, the mapping and localization module 1004 can determine a position of the vehicle 10 within the generated two-dimensional and/or three-dimensional map, including x and y position coordinates of the vehicle 10 and a direction of the vehicle 10. The position of the vehicle 10 can be used, as described above, to determine adjusted angles for the environmental sensors 20. Localization data generated by the mapping and localization module 1004 can include the determined position of the vehicle 10.

The path planning module 1006 receives the two-dimensional and/or three-dimensional map of the environment as well as the localization data from the mapping and localization module 1004. Based on the position of the vehicle 10, the two-dimensional and/or three-dimensional map, and the speed of the vehicle, as sensed by the vehicle speed sensor 38, the path planning module can determine a trajectory path for the vehicle 10 and an anticipated position of the vehicle 10, i.e., the anticipated position of the vehicle 10 in a predetermined time in the future, such as a specified number of seconds.

The pursuit module 1002 receives the anticipated position of the vehicle 10 from the pursuit module 1002. The pursuit module 1002 can then generate an adjusted angle for the sensor actuator(s) 22 based on the anticipated position of the vehicle 10. For example, the pursuit module 1002 can generate the adjusted angle such that the environmental sensors 20 point towards the anticipated position of the vehicle 10. The pursuit module 1002 can also generate the adjusted angle such that the environmental sensors 20 point towards a point along the trajectory path of the vehicle 10 from the anticipated position of the vehicle 10.

As shown in FIG. 10, the mapping and localization module 1004 can generate a synchronization trigger signal that is outputted to the environmental sensors 20. For example, the synchronization trigger signal can synchronize the environmental sensors 20 so that the environmental sensors 20 generate data at predetermined periodic trigger points, i.e., a designated rising or falling edge, of the synchronization trigger signal.

In this way, the present teachings provide a system 12 to optimize environmental sensor angles of a vehicle to provide an improved field of view for the environmental sensors 20, as compared with previous fixed angle systems.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
   a sensor that senses information about an environment of a subject vehicle;
   an actuator that rotates the sensor according to a commanded angle;
   a controller that determines a position and a trajectory path of the subject vehicle, that determines an adaptive point along the determined trajectory path based on the position, and that generates the commanded angle for the actuator to rotate the sensor towards the adaptive point; wherein
   the position determined by the controller includes coordinates of a location of the subject vehicle and a direction of the subject vehicle, and wherein the controller stores a preset distance, determines a preset point located the preset distance from the subject vehicle in the direction of the subject vehicle, and determines the adaptive point as a closest point to the preset point along the determined trajectory path.

2. The system of claim 1, wherein the sensor includes at least one of a camera, a Lidar sensor, a radar sensor, and an ultrasonic sensor.

3. The system of claim 1, further comprising a global positioning system, wherein the controller determines the position of the subject vehicle based on data from the global positioning system.

4. The system of claim 1, further comprising a vehicle speed sensor that determines a speed of the subject vehicle, wherein the controller determines the trajectory path of the subject vehicle based on the speed of the subject vehicle.

5. The system of claim 1, wherein the controller generates a map of an area surrounding the subject vehicle based on data from the sensor and determines the position of the subject vehicle based on the map of the area surrounding the subject vehicle.

6. The system of claim 1, wherein the controller receives feedback data from the sensor, determines a feedback angle of the sensor based on the feedback data, determines an angle error based on the commanded angle and the feedback angle, and adjusts the commanded angle based on the angle error.

7. The system of claim 1, wherein the controller controls at least one of a steering system, a throttle system, a transmission system, and a braking system of the subject vehicle based on data from the sensor.

8. The system of claim 1, wherein the controller generates an alert based on the information sensed by the sensor about the environment of the subject vehicle.

9. A method comprising:
   sensing, with a sensor, information about an environment of a subject vehicle;
   determining, with a controller, a position and a trajectory path of the subject vehicle;

determining, with the controller, an adaptive point along the determined trajectory path based on the position;

generating, with the controller, a commanded angle for an actuator of the sensor to rotate the sensor towards the adaptive point;

rotating, with the actuator, the sensor according to the commanded angle; wherein the position determined by the controller includes coordinates of a location of the subject vehicle and a direction of the subject vehicle, the method further comprising:

storing, with the controller, a preset distance;

determining, with the controller, a preset point located the preset distance from the subject vehicle in the direction of the subject vehicle; and determining, with the controller, the adaptive point as a closest point to the preset point along the determined trajectory path.

10. The method of claim 9, wherein the sensor includes at least one of a camera, a Lidar sensor, a radar sensor, and an ultrasonic sensor.

11. The method of claim 9, further comprising determining, with the controller, the position of the subject vehicle based on data from a global positioning system of the subject vehicle.

12. The method of claim 9, further comprising determining, with the controller, the trajectory path of the subject vehicle based on a speed of the subject vehicle as sensed by a vehicle speed sensor that determines the speed of the subject vehicle.

13. The method of claim 9, further comprising generating, with the controller, a map of an area surrounding the subject vehicle based on data from the sensor and determining, with the controller, the position of the subject vehicle based on the map of the area surrounding the subject vehicle.

14. The method of claim 9, further comprising:

receiving, with the controller, feedback data from the sensor;

determining, with the controller, a feedback angle of the sensor based on the feedback data;

determining, with the controller, an angle error based on the commanded angle and the feedback angle; and adjusting, with the controller, the commanded angle based on the angle error.

15. The method of claim 9, further comprising controller, with the controller, at least one of a steering system, a throttle system, a transmission system, and a braking system of the subject vehicle based on data from the sensor.

16. The method of claim 9, further comprising generating, with the controller, an alert based on the information sensed by the sensor about the environment of the subject vehicle.

* * * * *